United States Patent Office 2,981,740
Patented Apr. 25, 1961

2,981,740

PRODUCTION OF 4-HYDROXYPYRAZOLES

Erich Henkel, Ludwigshafen (Rhine), and Herbert Friederich, Worms, Germany, assignors to Badische Anilin- & Soda-Fabrik Aktiengesellschaft, Ludwigshafen (Rhine), Germany No Drawing. Filed Mar. 8, 1956, Ser. No. 570,217

Claims priority, application Germany Mar. 19, 1955

9 Claims. (Cl. 260—310)

This invention relates to an improved method of producing 4-hydroxypyrazoles.

Only a few compounds containing the ring system of 4-hydroxypyrazoles or the tautomeric pyrazolone-(4) have hitherto been known. Their production has been carried out by multi-stage, troublesome methods (cf. Liebigs Ann. Chemie 313 (1900), 1–24).

We have now found that 4-hydroxypyrazoles are obtained in a simple way by reacting a beta-halogen-alpha-diketone of the general formula

R—CHX—CO—CO—R'

(in which R and R' represent alkyl, aralkyl, cycloalkyl or aryl groups, R may also be a hydrogen atom, and X represents chlorine or bromine) with hydrazine or a monosubstitution product of hydrazine, and splitting off hydrogen halide from the resultant monohydrazones.

When using 4-bromohexanedione-(2.3) and phenylhydrazine as initial materials, the reaction may be formulated as follows:

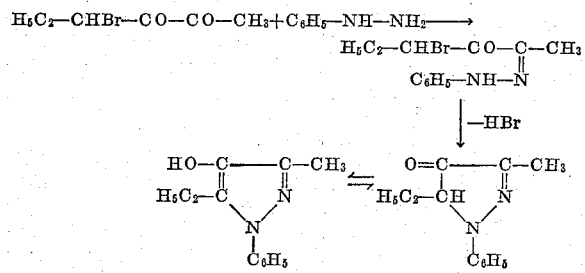

Instead of 4-bromohexanedione-(2.3) there are also suitable, inter alia, as initial materials monochlordiacetyl, monobromdiacetyl, 1 - bromo 1 - phenylbutanedione-(2.3), 5 - bromohexanedione - (3.4), 4 - chlorooctanedione - (2.3), 6 - phenyl - 4 - bromohexanedione - (2.3), 3 - bromo - 1 - p - tolylpropanedione - (1.2) and 5 - cyclohexyl - 4 - bromohexanedione - (2.3).

Instead of phenyl hydrazine there can be used for example unsubstituted hydrazine, semicarbazide, monomethyl, butyl, cyclohexyl, benzyl, acetyl, p-toluene sulfonyl, benzoyl hydrazines, the isomeric chlorophenylhydrazines, nitrophenylhydrazines, and naphthylhydrazines. The 4-hydroxypyrazole derivatives unsubstituted on the N-atom 1 or substituted by CO—NH$_2$ or an alkyl, acyl or aroyl group are then obtained.

It is surprising that by the action of hydrazine or monosubstituted hydrazines on the beta-monohalogenated-alpha-diketones, even when using a large excess of the hydrazine, it is almost exclusively only the carbonyl group farther removed from the halogen atom which enters into reaction. While the hydrazone formation in general proceeds smoothly at ordinary or lower temperature, e.g. at from about −5° up to about +30° C. the cyclization usually requires elevated temperatures, as for example 60° to 150° C. as well as the presence of agents which take up hydrogen halide, as for example tertiary amines or alkalies.

The process can therefore be carried out in two stages, i.e. by isolation of the monohydrazone and subsequent splitting off of hydrogen halide. In most cases, however, it is possible and advantageous to allow the whole reaction to proceed in one stage by reacting the monohalogen-diketone with the hydrazine in the presence of alkali metal hydroxides or carbonates earth alkaline oxides or hydroxides or of tertiary amines and an inert solvent at elevated temperature.

As solvents inert substances, i.e. substances which do not react with the initial materials and the reaction products, such as benzene, toluene or tetrahydrofurane, are suitable in which the end product of the reaction, namely the hydrogen halide salt of the tertiary amine, is insoluble or soluble only sparingly. Hydrocarbons, such as benzene and toluene, have the additional advantage that the water formed during the reaction can be continuously removed from the reaction mixture azeotropically. On the other hand, however, it is also possible to work in aqueous-alcoholic medium in order to keep the amine salt in solution and to cause the separation of the 4-hydroxypyrazole derivative which is more difficultly soluble therein.

As agents for taking up the hydrogen halide formed during the cyclization, not only alkalies, but also in particular tertiary amines, such as pyridine and trimethylamine and its higher homologues, are suitable. If desired an excess of the hydrazine compound can also be used as the hydrogen halide acceptor, or in some cases a special cyclization agent can be dispensed with altogether because the 4-hydroxypyrazoles themselves exhibit a weakly basic function and are capable of forming hydrohalides which then in many cases separate as such.

To avoid undesirable side reactions it has been found to be favorable to carry out the reactions in an inert atmosphere free from molecular oxygen, as for example under nitrogen. In general it is also advantageous to use the monohalogenated-alpha-diketone in less than the amount required, and to introduce it gradually a little at a time into the liquid mixture of the other reactants in order to avoid a self-condensation of the diketone which readily occurs in alkaline medium.

The 4-hydroxypyrazole derivatives exhibit amphoteric properties. They have a good solubility in dilute mineral acids and in aqueous alkali solutions with the formation of salts, but in general are insoluble or difficultly soluble in cold neutral water. Their alcoholic solutions give a strong colour reaction with ferric chloride.

The 4-hydroxypyrazoles readily accessible by the said process are valuable intermediate products, in particular for pharmaceutical products, insecticides and dyestuffs. In the form of their alkali metal salts they exert a solubilizing effect on certain compounds which are but sparingly water-soluble. A 15% aqueous solution of the sodium salt of 1-phenyl-3-methyl-4-hydroxypyrazole, for instance, takes up about 15% (by weight) of pyramidon (=1 - phenyl - 2.3 - dimethyl - 4 - dimethylaminopyrazolone-5) whereas pure water dissolves only 5% of its weight of said substance.

The following examples will further illustrate this invention but the invention is not restricted to these examples. The parts specified are parts by weight.

*Example 1*

193 parts of 4-bromohexanedione-(2.3) (B.P.$_{20}$=68° to 72° C.) are gradually led, in a weak current of nitrogen, into a mixture of 110 parts of phenylhydrazine, 150 parts of triethylamine and 1000 parts of toluene which is situated in a stirring vessel provided with a water remover, preferably by leading it in directly through the nitrogen inlet tube into the liquid in order to avoid self-condensation of the bromo diketone which can happen upon contact with the gaseous amine. The mixture is heated for 4 hours under reflux, the theoretical amount of water (18 parts) being separated in the water remover during the course of the first 2½ hours. After cooling, the deposited crystals of triethylamine hydrobromide (172 parts) are filtered off by suction and washed with toluene. The filtrate combined with the washing liquid is concentrated at reduced pressure, 99 parts of 1-phenyl-2-methyl-5-ethyl-4-hydroxypyrazole of the melting point 106° to 109° C. thereby separating. The remaining mother liquor is preferably again diluted with toluene and shaken with 5% aqueous caustic soda solution. By neutralizing the aqueous layer with hydrochloric acid, a further 12 parts of 1-phenyl-3-methyl-5-ethyl-4-hydroxypyrazole are obtained.

After recrystallization from cyclohexane and a little absolute alcohol or from methanol and water, the 1-phenyl-3-methyl-5-ethyl-4-hydroxypyrazole forms colourless needles melting at 108° to 110° C. and which are insoluble in water but soluble in dilute acids and alkalies. In methanol the compound shows a deep brown colour reaction with ferric chloride. The hydrochloride, obtained by evaporating a solution of 1-phenyl-3-methyl-5-ethyl-4-hydroxypyrazole in concentrated hydrochloric acid melts at 132° to 134° C.

*Example 2*

1 mol of 4-bromohexanedione-(2.3) is first reacted with 1.5 to 2 mols of phenylhydrazine in benzene at temperatures from about −5° up to about +30° C., the monophenyl hydrazone thereby being obtained which forms yellow crystals of the melting point 110° to 112° C. from cyclohexane and which is insoluble in water as well as in dilute mineral acids or alkalies. It is converted into 1-phenyl-3-methyl-5-ethyl-4-hydroxypyrazole by boiling with 1 mol of triethylamine in toluene.

*Example 3*

70 parts of monobromodiacetyl (B.P.$_{14}$=59° to 61° C.) dissolved in 80 parts of toluene are gradually led into a boiling mixture of 54 parts of phenylhydrazine, 60 parts of triethylamine and 500 parts of toluene. The whole is then boiled for 3 hours while circulating out the water formed. After cooling, the precipitated triethylamine hydrochloride is filtered off by suction. The dark brown filtrate is shaken twice with water and then twice with 5% caustic soda solution. The combined alkaline extracts are purified by shaking with carbon tetrachloride and treatment with animal carbon and then hydrochloric acid is added until there is a weak acid reaction (pH=4 to 5). The precipitated 1-phenyl-3-methyl-4-hydroxypyrazole is recrystallized from aqueous alcohol or cyclohexane and absolute alcohol and then forms colourless crystals of the melting point 165° to 167° C. which in methanol show a green ferric chloride reaction and which are insolule in water but well soluble in dilute acids and alkalies.

The reaction can also be carried out in two stages as described in Example 2 by isolating the monobromodiacetyl monophenyl hydrazone which forms yellow crystals of the melting point 125° to 126° C. from cyclohexan and then cyclizing it by boiling it under reflux with about 1 mol of triethylamine diluted with toluene.

A 15% aqueous solution of the sodium salt of the 1-phenyl-3-methyl-4-hydroxypyrazole takes up about 15 parts (by weight) of 1-phenyl-2.3-dimethyl-4-dimethylaminopyrazolone-(5) of which only 5% are soluble in pure water.

*Example 4*

38.6 parts of 4-bromodexanedione-(2.2) are allowed to flow in a current of nitrogen in the cold into a mixture of 11 parts of 93% hydrazine hydrate, 22 parts of triethylamine and 180 parts of tetrahydrofurane while stirring vigorously. After boiling for 3 hours under reflux the whole is further stirred for 10 hours, 24 parts of triethylamine hydrobromide thereby separating out. After filtering off by suction the white needles and separating a small of an aqueous layer, the filtrate is concentrated, 17 parts of colourless crystals are obtained which after filtration by suction and recrystallization from water yield 9 parts of 3-methyl-5-ethyl-4-hydroxypyrazole of the melting point 179° to 181° C. The remaining tetrahydrofurane solution is completely evaporated to dryness. From the semi-crystalline residue a further 7 parts of 3-methyl-5-ethyl-4-hydroxypyrazole are recovered by digestion with warm benzene and filtration by suction. The new compound is soluble only sparingly in cold water, but has good solubility in hot water as well as in dilute acids and alkalies. In methanol it shows a brown-violet ferric chloride colour reaction.

*Example 5*

A mixture of 48.3 parts of 4-bromohexanedione-(2.3) and 20 parts of methanol is allowed to flow at room temperature while stirring vigorously in the course of four hours into a filtered solution of 30 parts of semicarbazide hydrochloride and 30 parts of anhydrous sodium acetate in 125 parts of water and 15 parts of methanol. After stirring for a further 10 hours at room temperature the 4-bromohexanedione-(2.3)-monosemicarbazone which is precipitated in almost quantitative yield is filtered off by suction, washed with water and recrystallized from alcohol. It has the melting point 199° to 200° C.

For cyclization, 10 parts of the monosemicarbazone are boiled under reflux for 30 hours with a mixture of 50 parts of triethylamine and 25 parts of normal propanol while stirring and leading in nitrogen. The resultant solution is evaporated to dryness under reduced pressure and digested with a little hot ethyl acetate. The crystalline precipitate is filtered off by suction, washed with water to remove triethylamine hydrobromide and recrystallized from normal propanol or ethyl acetate. 4.5 parts of 1-carbamido-3-methyl-5-ethyl-4-hydroxypyrazole of the melting point 187° to 189° C. are obtained. The new compound in alcoholic solution shows a green ferric chloride colour reaction.

*Example 6*

Into a filtered solution of 28.9 parts of phenylhydrazine hydrochloride and 20 parts of sodium acetate trihydrate in 500 parts of water there are gradually added while stirring and cooling at about 0° C. 22 parts of monochlorodiacetyl (B.P.$_{20}$=60° to 65° C.). After stirring for 12 hours the yellow precipitate formed is filtered off by suction and dried, 37 parts of monochlorodiacetyl-monophenylhydrazone being obtained which after recrystallization from methanol or cyclohexane melts at 158° to 159° C.

33 parts of the crude monochlorodiacetyl-monophenylhydrazone are introduced at about 70° to 80° C. while stirring vigorously into a solution of 25 parts of sodium hydroxide in a mixture of 500 parts of water and 50 parts of methanol. The clear orange coloured solution obtained after about 30 minutes of stirring is cooled, filtered if necessary and then acidified with 5% aqueous sulfuric acid until a pH value of about 4 is reached. The nearly colourless precipitate is filtered off by suction, washed with water and dried. There are obtained 25.5 parts of 1-phenyl-3-methyl-4-hydroxypyrazole melting at 164° to 165° C.

When adding diazotized 3-nitroaniline to an aqueous alcaline solution of said 4-hydroxypyrazole an orange-yellow azo dyestuff is formed which can be used as pigment.

*Example 7*

50 parts of 3-chlorophenylhydrazine sulphate (commercial quality) and 50 parts of sodium acetate trihydrate are dissolved in 1000 parts of water and 200 parts of methanol. A mixture of 25 parts of monochlorodiacetyl and 25 parts of methanol is allowed to flow gradually into the filtered solution while cooling with ice and stirring vigorously. After stirring for 20 hours, the yellow 3-chlorophenylhydrazone of the monochlorodiacetyl is filtered off by suction. It melts at 136° to 138° C.; the yield amounts to 45 parts.

This product is heated at 90° C. for 45 minutes in a solution of 20 parts of sodium hydroxide in 300 parts of water. After cooling, resinous by-products are filtered off, the filtrate is acidified with dilute sulfuric acid while stirring and cooling with ice until the pH value is 4 and 19 parts of 1-(3'-chlorophenyl)-3-methyl-4-hydroxypyrazole are obtained after filtration by suction and drying. The compound recrystallized from cyclohexane and propanol melts at 175° to 176° C. and exhibits a deep green colour reaction in methanol solution with ferric chloride.

We claim:

1. An improved process for the production of 4-hydroxypyrazoles which comprises reacting a beta-halogen-alpha-diketone of the general formula

R—CHX—CO—CO—R' in which X represents a halogen atom selected from the group consisting of chlorine and bromine, R represents a member of the group consisting of hydrogen, lower alkyl, aryl, aralkyl and cycloalkyl groups and R' represents a lower alkyl group with a hydrazino compound of the general formula

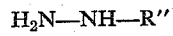

H₂N—NH—R'' in which R'' represents a member of the group consisting of hydrogen, lower alkyl, aryl, aralkyl and cycloalkyl group, and heating the monohydrazones formed until cyclization is completed.

2. An improved process for the production of 4-hydroxypyrazoles which comprises reacting a beta-halogen-alpha-diketone of the general formula

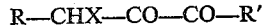

R—CHX—CO—CO—R' in which X represents a halogen atom selected from the group consisting of chlorine and bromine, R represents a member of the group consisting of hydrogen, lower alkyl, aryl, aralkyl and cycloalkyl groups and R' represents a lower alkyl group with a hydrazino compound of the general formula

H₂N—NH—R'' in which R'' represents a member of the group consisting of hydrogen, lower alkyl, aryl, aralkyl and cycloalkyl groups, and heating the monohydrazones formed in the presence of basic agents selected from the group consisting of tertiary amines, alkali metal hydroxides and excess hydrazino compounds until cyclization is completed.

3. A process for the production of 1-phenyl-3-methyl-5-ethyl-4-hydroxypyrazole which comprises adding 4-bromohexanedione-(2.3) to a mixture of about equivalent amounts of phenylhydrazine and triethylamine diluted with an aromatic hydrocarbon which is liquid at room temperature, heating the mixture under reflux while removing the water formed and filtering off the triethylamine hydrobromide.

4. A process for the production of 1-phenyl-3-methyl-5-ethyl-4-hydroxypyrazole which comprises adding 4-bromohexanedione-(2.3) to a mixture of about 1.5 to 2 moles of phenylhydrazine and an aromatic hydrocarbon which is liquid at room temperature at temperatures from about —5° up to about +30° C., separating the 4-bromohexanedione-(2.3)-monophenylhydrazone formed, boiling it under reflux with about equivalent amounts of triethylamine diluted with toluene and filtering off the triethylamine hydrobromide.

5. A process for the production of 1-phenyl-3-methyl-4-hydroxypyrazole which comprises adding monobromo 4-hydroxypyrazole which comprises adding monobromo diacetyl gradually to a mixture of phenylhydrazine and triethylamine diluted with an aromatic hydrocarbon which is liquid at room temperature, boiling the mixture under reflux while removing the water formed and filtering off the triethylamine hydrobromide formed.

6. A process for the production of 1-phenyl-3-methyl-4-hydroxypyrazole which comprises adding monobromo diacetyl gradually to a mixture of phenylhydrazine and an aromatic hydrocarbon which is liquid at room temperature at temperatures from about —5° up to about +30° C., separating the monobromodiacetyl-monophenylhydrazone formed, boiling it under reflux with about equivalent amounts of triethylamine diluted with an aromatic hydrocarbon which is liquid at room temperature and filtering off the triethylamine hydrobromide formed.

7. A process for the production of 3-methyl-5-ethyl-4-hydroxypyrazole which comprises adding gradually 4-bromohexanedione-(2.3) to a mixture of about equivalent amounts of hydrazine hydrate and triethylamine diluted with tetrahydrofurane, boiling the mixture under reflux and filtering off the triethylamine hydrobromide formed.

8. A process for the production of 1-carbamido-3-methyl-5-ethyl-4-hydroxypyrazole which comprises adding 4-bromohexanedione-(2.3) to an aqueous solution of about equivalent amounts of semicarbazide, filtering off the 4 - bromohexanedione - (2.3) - monosemicarbazone formed and boiling it under reflux with about equivalent amounts of triethylamine diluted with n-propanol.

9. A process for the production of 1-phenyl-3-methyl-4-hydroxypyrazole which comprises adding monochlorodiacetyl at about 0° C. gradually to an aqueous solution of about equivalent amounts of phenylhydrazine hydrochloride and sodium acetate, filtering off the monochlorodiacetyl-monophenylhydrazone formed, introducing it at about 70° to 80° C. into an aqueous solution of an excess of sodium hydroxide and neutralizing the solution obtained until a pH value of about 4 is reached.

References Cited in the file of this patent

FOREIGN PATENTS 681,376      Great Britain _____ Oct. 22, 1952

OTHER REFERENCES

Bertho et al.: Chem. Abst., vol. 21, p. 3903 (1927).
Chattaway et al.: Chem. Abst., vol. 25, col. 3342 (1931).
Fusco et al.: Chem. Abst., vol. 38, col. 2929 (1944).
Fricke: Chem. Abst., vol. 46, col. 7094 (1952).

UNITED STATES PATENT OFFICE
CERTIFICATE OF CORRECTION

Patent No. 2,981,740                                        April 25, 1961

Erich Henkel et al.

It is hereby certified that error appears in the above numbered patent requiring correction and that the said Letters Patent should read as corrected below.

Column 3, line 56, for "insolule" read -- insoluble --; column 4, line 3, after "small" insert -- amount --.

Signed and sealed this 21st day of November 1961.

(SEAL)
Attest:

ERNEST W. SWIDER                                      DAVID L. LADD
Attesting Officer                                            Commissioner of Patents
                                                                                       USCOMM-DC